July 28, 1959     W. D. TEAGUE, JR     2,896,919
OIL COOLER EMERGENCY BY-PASS VALVE
Filed Nov. 30, 1949     4 Sheets-Sheet 1

INVENTOR.
WALTER D. TEAGUE JR.
BY
ATTORNEY

INVENTOR.
WALTER D. TEAGUE JR.
BY
ATTORNEY

July 28, 1959     W. D. TEAGUE, JR     2,896,919
OIL COOLER EMERGENCY BY-PASS VALVE
Filed Nov. 30, 1949     4 Sheets-Sheet 3

INVENTOR.
WALTER D. TEAGUE JR.
BY
ATTORNEY

July 28, 1959

W. D. TEAGUE, JR 2,896,919

OIL COOLER EMERGENCY BY-PASS VALVE

Filed Nov. 30, 1949

INVENTOR.
WALTER D. TEAGUE JR.
BY

-ATTORNEY-

United States Patent Office 2,896,919
Patented July 28, 1959

2,896,919

OIL COOLER EMERGENCY BY-PASS VALVE

Walter D. Teague, Jr., Alpine, N.J., assignor to Bendix Aviation Corporation, Teterboro, N.J., a corporation of Delaware Application November 30, 1949, Serial No. 130,157

9 Claims. (Cl. 257—2)

The present invention relates to fluid valves and particularly to improvements in a protective device of the type adapted to by-pass the radiator in an aircraft engine oil system, such as disclosed and claimed in the co-pending application Serial No. 106,222, filed July 22, 1949, by Walter D. Teague, Jr., now U.S. Patent No. 2,647,730, granted August 4, 1953, and assigned to the assignee of the present application.

The invention contemplates hydraulic means for detecting leakage in an engine aircraft oil radiator and to by-pass the radiator automatically if leakage occurs, thereby protecting the engine proper.

The protective means herein disclosed find a particularly useful application in military aircraft installations where a direct hit on the engine radiator, while insufficient of disable the craft, might still cause disaster due to the complete loss of the oil supply.

It is known in the art, and it has been learned under actual combat conditions that a craft can effectively cruise for a great distance and for a prolonged period of time without the engine oil circulating through the radiator, for although under these conditions the oil will overheat and lose effectiveness, lubrication will still be present, and a considerable time will elapse before the oil overheats to a point of complete breakdown. This unfavorable condition is further mitigated by the fact that as the heat content of the oil rises, the piping, sump, valves, oil reservoir and other components of the oil system begin functioning as radiators, since the heat transfer from the overheated oil to these components is rapidly accelerated.

It is, therefore, possible for the craft to continue functioning for a fair length of time, and thereby, enable the operators to reach a friendly base, or at least select a site for an emergency landing.

It is equally well-known in the art, however, that without oil supply whatsoever, the engine will overheat and bind in a relatively brief interval of time, thereby forcing an emergency landing.

It is, therefore, one of the objects of the present invention to provide means whereby the foregoing danger is eliminated, and to do so in a novel and effective manner.

Another object of the invention is to provide a by-pass unit capable of detecting leakage in an aircraft engine oil radiator, and of by-passing the radiator automatically upon said leakage exceeding a predetermined value.

Another object of the invention is to provide a system for an engine whereby the oil entering the cooling radiator will automatically by-pass the radiator in the event of a hit thereon by a bullet or other missile.

Still another object of the invention is to provide protective means of the above-indicated character wherein in the event of emergency operation thereof, electrical means will simultaneously apprise the operators of the craft of the dangers of the situation.

Still another object of the invention is to provide a valve of the above-indicated nature which will not unduly penalize the aircraft owing to excessive weight considerations.

Still another object of the invention is to provide a by-pass valve for an aircraft engine oil system which will by-pass the radiator of the system in the event of a leakage therein due to a hit thereon by a bullet or other missile.

A further object of the invention is to provide a valve of the above-indicated nature which will be economical to manufacture, easy to maintain and install, and yet positive and reliable in operation.

The foregoing and other objects and advantages will appear more fully hereinafter from a consideration of the detailed description which follows, taken together with the accompanying drawing wherein one embodiment of the invention is illustrated by way of example. It is to be expressly understood, however, that the drawing is for the purposes of illustration only and is not to be construed as defining the limits of the invention.

Referring to the drawings wherein like reference characters designate like parts, Figure 1 is a plan view of the by-pass valve.

Figure 2:
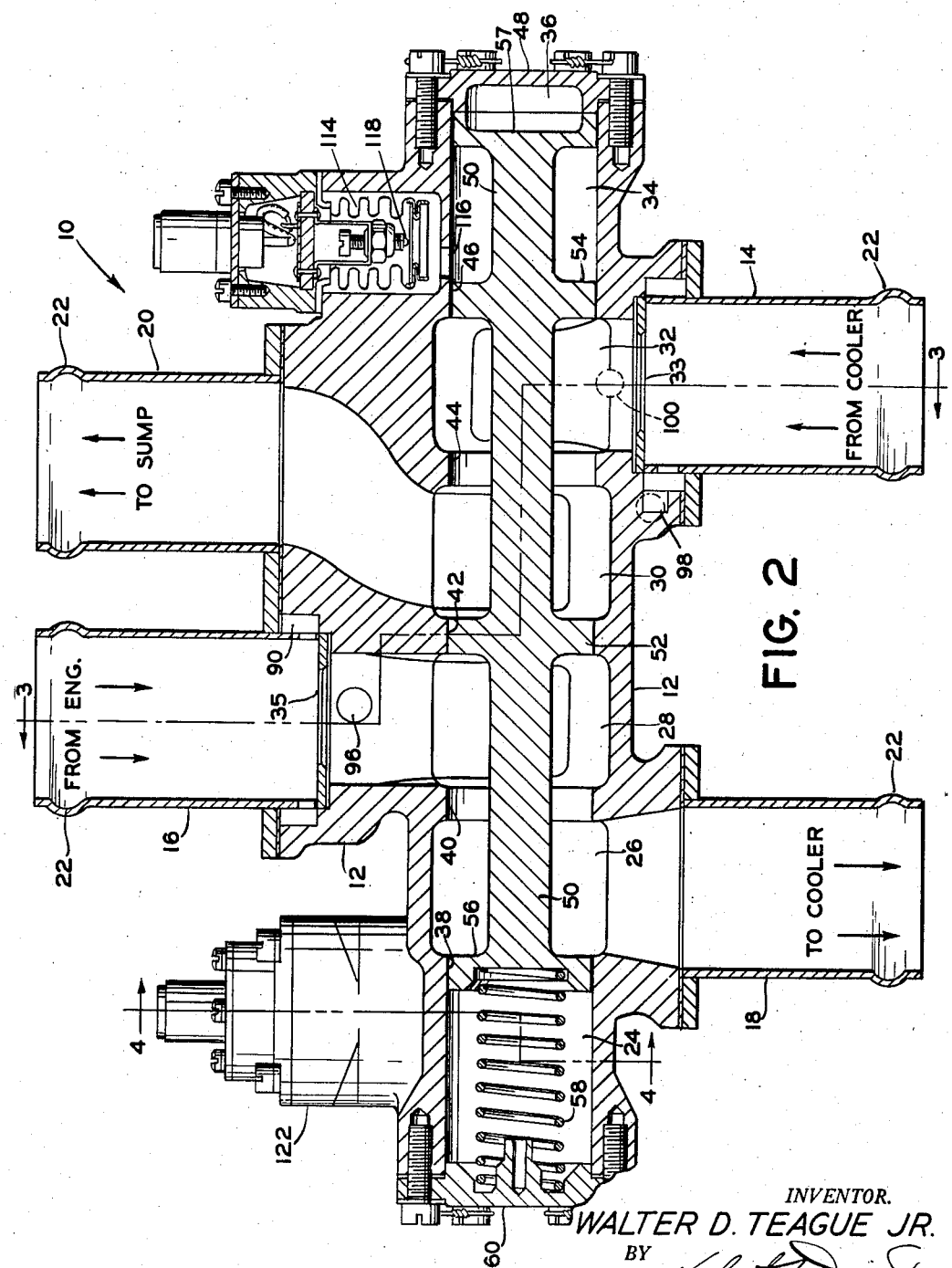
Figure 2 is an elevation in section taken along the line 2—2 of Figure 1.
Figure 6:
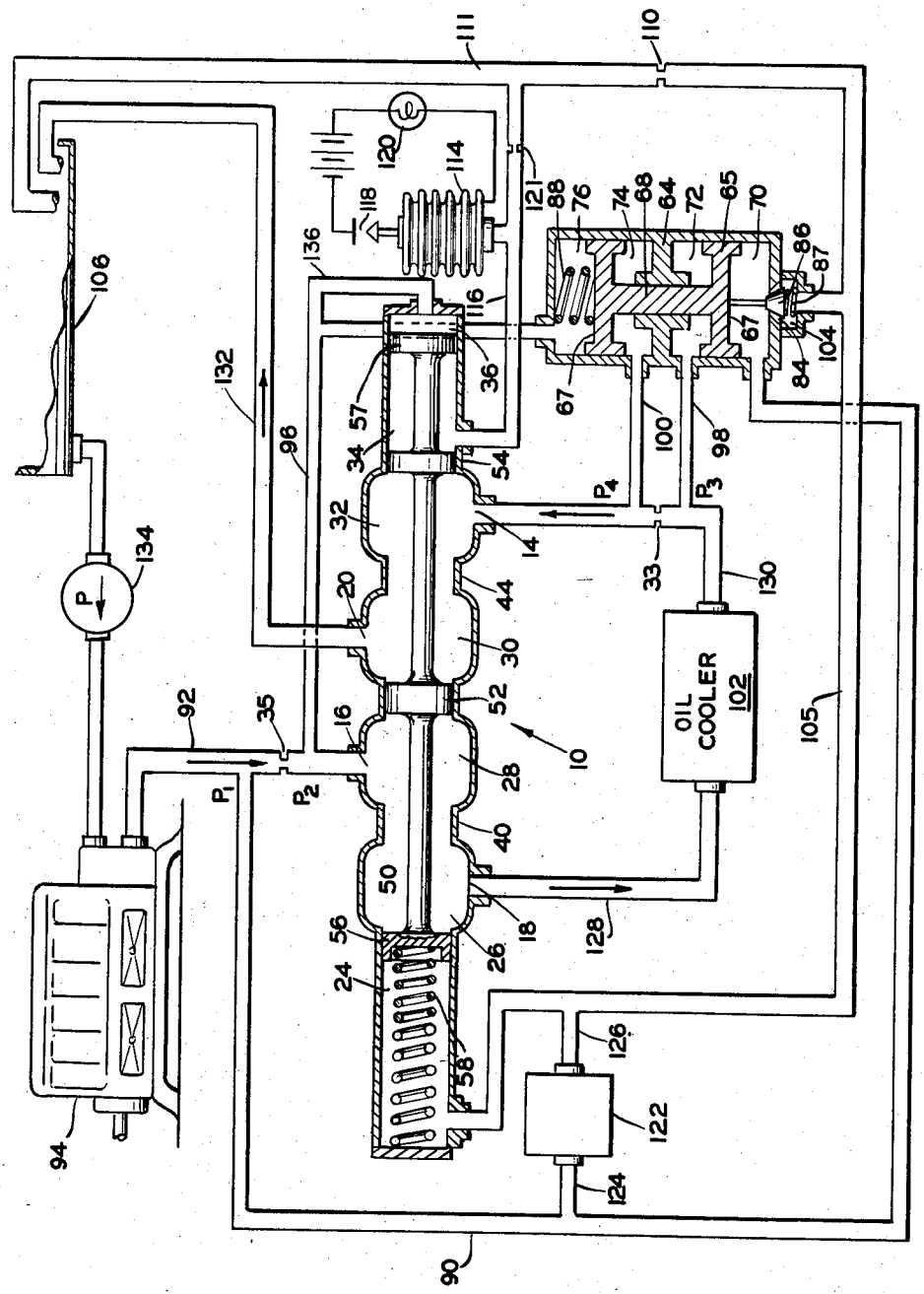
Figure 6 is a schematic drawing of the oil system of an engine including the device.

Referring now to Figures 2 and 6, a valve generally indicated by the numeral 10 comprises a casing 12, including tubular inlets 14 and 16 and tubular outlets 18 and 20. The inlets 14 and 16 and the outlets 18 and 20 are headed at their ends as at 22 to increase their suitability for hose connections when the valve 10 is installed in an engine oil cooling system as shown in Figure 6.

The casing 12 has a substantially annular thru bore divided into chambers 24, 26, 28, 30, 32, 34 and 36 by jutting partitions 38, 40, 42, 44 and 46, and end plate 48 and plunger 50, respectively. The plunger 50 further contains skirts 52, 54, 56 and 57 of substantially the same outer diameter as the inner diameter of the jutting partitions 38, 40, 44 and 46, and adapted to function as a valve seat therewith.

The chamber 24 contains a relatively light spring 58 which is anchored onto the end plate 60 and bears against the plunger 50 thereby normally biasing the plunger 50 to the right in the position shown in Figures 2 and 6. Said normal position of the plunger 50 permits communication of the inlet 16 with the outlet 18 through chambers 26 and 28, and of inlet 14 with outlet 20 through chambers 30 and 32.

The inlets 14 and 16 contain orifices 33 and 35, so that the fluid pressures on the upstream and downstream sides of the orifices vary, and in the position of the plunger 50 as shown in Figures 2 and 6, for normal valve operation, if the pressures on the upstream and downstream side of orifice 35 are designated as $P_1$ and $P_2$, respectively, and the pressures on the upstream and downstream sides of the orifice 33 are designated as $P_3$ and $P_4$, respectively, then since in normal operation the oil flow through orifices 33 and 35 is equal as hereinafter explained $(P_1-P_2)$ and $(P_3-P_4)$ will likewise be equal.

Figure 1:
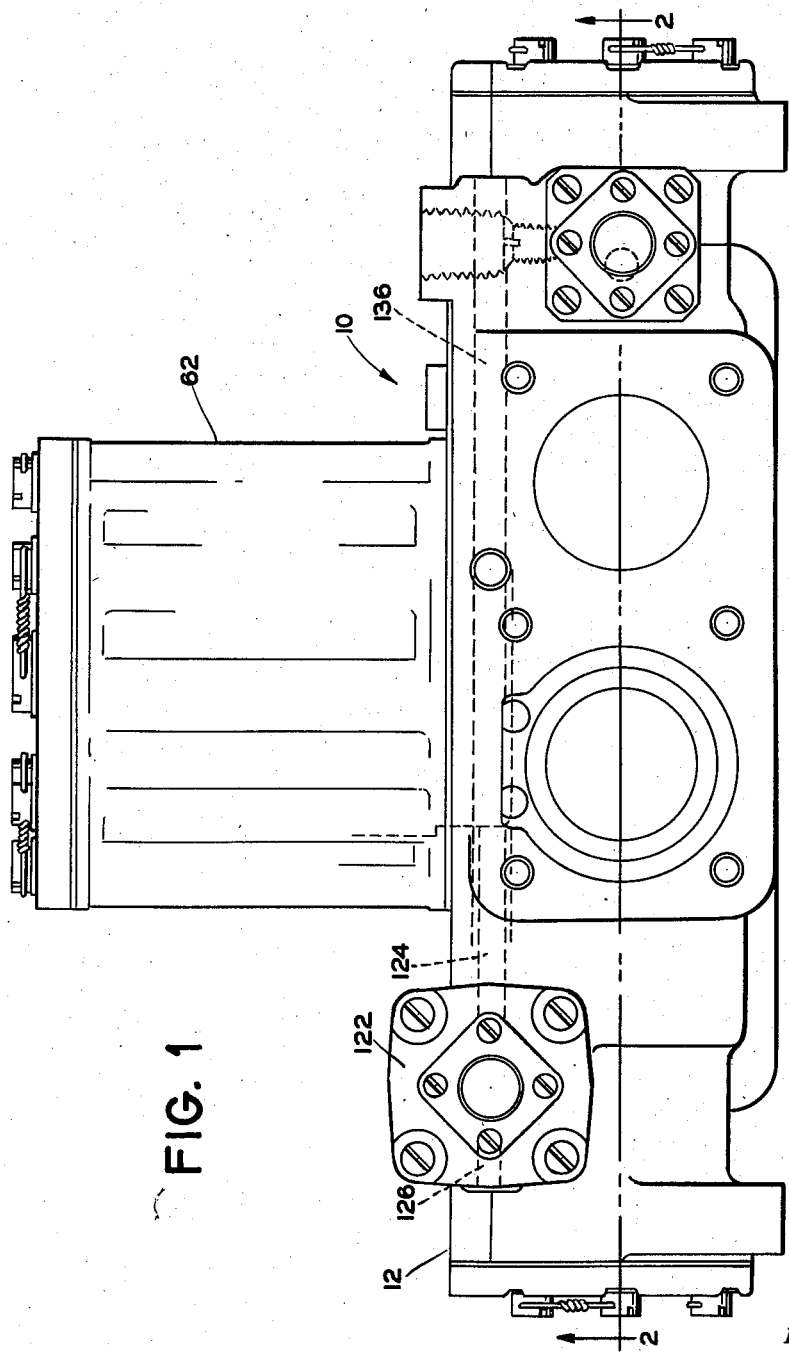
Figure 3:
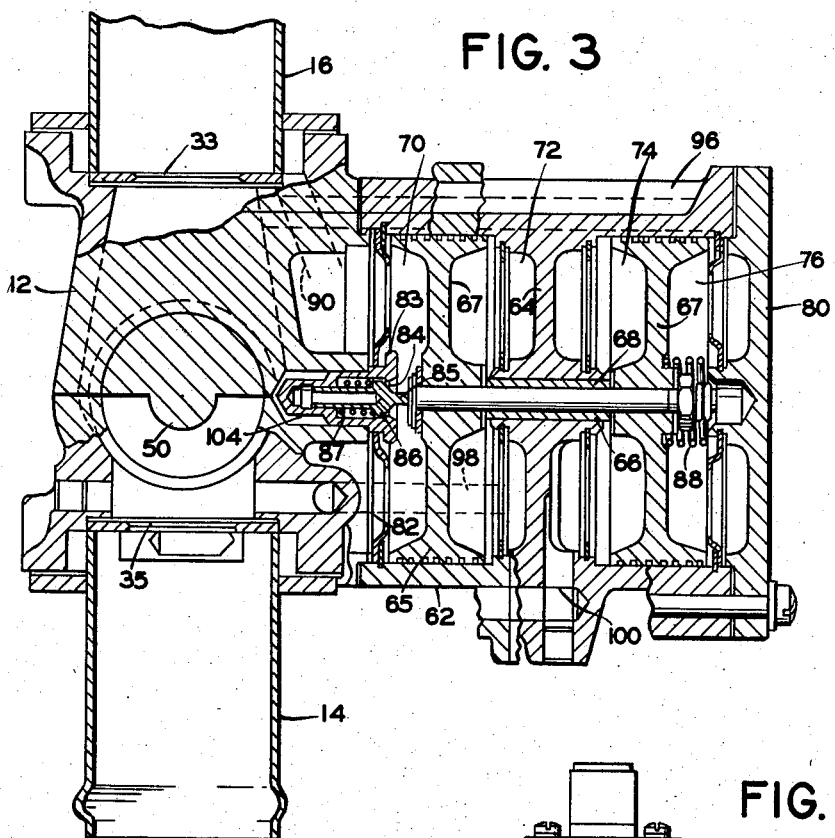
Figure 3 is a sectional view taken along the line 3—3 of Figure 2.

Referring now to Figures 1 and 3, a cylindrical protruding portion 62 integral with the casing 12, contains a dividing bulkhead 64 with a central opening 66. An H-shaped plunger 65 including dual legs 67, is disposed with the cross arm 68 through the opening 66 of the bulkhead 64 in close fitting relation therewith and is free to slide within the cylindrical portion 62. In this manner, the cylindrical portion 62 is divided into four variable pressure chambers 70, 72, 74 and 76, the chamber 76 being sealed off by a removable end plate 80 and the chamber 70 being sealed off by a partition 82.

The partition 82 has mounted therein a valve seat portion 83 including a hole 84 (Figure 5) through which the fluid in the chamber 70 may escape. A bleed-valve 86 has a valve stem 85 actuated by the plunger 68 and seats against the hole 84 under the biasing force of a spring 87 so as to thereby regulate the fluid flow therethrough. A spring 88 bearing against the plunger 66 and anchored against the end plate 80, biases the plunger 66 so as to normally maintain the valve 86 in open position.

The manner in which the pressure chambers 70, 72, 74 and 76 are pressurized is as follows:

A passageway 90 (Figs. 2, 3 and 6) junctions with a fluid inlet line 92 (Fig. 6) from the engine 94, up stream of the inlet orifice 35 and leads therefrom to the pressure chamber 70. A second passageway 96 (Figs. 2, 3 and 6) leads from downstream of the inlet orifice 35 to the pressure chamber 76. A third passageway 98 (Figs. 2, 3 and 6) leads from upstream of the inlet orifice 33 to the pressure chamber 72, and a fourth passageway 100 (Figs. 2, 3 and 6) leads from downstream of the inlet orifice 33 to the pressure chamber 74. It is, therefore, apparent that the sliding plunger 68 will be subjected to the differential of the pressures upstream and downstream of the inlet and outlet orifices 33 and 35 in addition to the force of the spring 88, so that normally with no leakage in oil cooler 102 (Fig. 6) the flow through the orifice 33 will approximate the flow through the orifice 35, therefore the pressure in chamber 70 plus the pressure in chamber 74 will equal the pressure in chamber 72 plus the pressure in chamber 76, and the sole unbalancing force will be that of the spring 88 tending to keep the valve 86 open.

Figure 4:
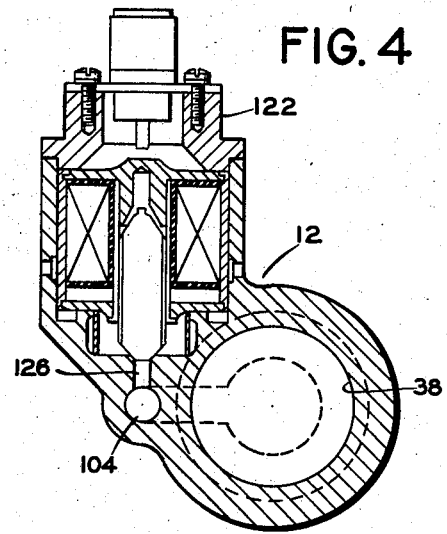
Figure 4 is a section taken along the line 4—4 of Figure 2.

The valve 86 protrudes into a passageway 104 (Figs. 3, 4 and 6) which communicates through a passageway 105 with the spring chamber 24 and through an orifice 110 and passage 111 with the engine sump 106, the latter being substantially at atmospheric pressure. The valve 86 controls the valve throat 84 which joins the chamber 70 to the passageway 104.

An orifice 110 (Fig. 6) leads from the passageway 105 to the passageway 111 and the relative sizes of the valve 86 and the orifice 110 are such that the pressure at the spring chamber 24 end of the valve 10 is substantially the same as the pressure on the upstream side of orifice 35 when the bleed-valve 86 is open.

A differential bellows 114 is affected at one side by atmospheric pressure and at the opposite side by oil pressure and communicates by means of a passageway 116 (Figures 2 and 6) with the chamber 34 of the valve 10. The bellows 114 actuates a switch 118 which upon closing causes the energizing of a warning light 120 upon the plunger 50 being moved to the left as explained hereinafter.

A small bleed orifice 121 (Fig. 6) is provided to prevent leakage past the plunger 50 from building up a pressure sufficient to actuate the bellows 114 (Figs. 2 and 6) when the valve 10 is in the normal position. The bleed orifice 121 connects passage 116 to passage 111 leading to the sump 106.

A solenoid-operated valve 122 controls passageways 124 and 126 which in turn open into passageways 90 and 105, respectively. The solenoid valve 122 is controlled by a reset switch, not shown here, conveniently located within reach of the operators of the craft.

Referring now to Figure 6, an outlet conduit 128 leads from the outlet 18 to the oil cooler 102, and an inlet conduit 130 leads from the cooler to the inlet 14. A conduit 132 leads from the outlet 20 to the sump 106 from whence the oil is drawn by means of pump 134 to the engine 94. A passageway 136 (Figs. 1 and 6) leads from the conduit 96 to the chamber 36 thereby opening said chamber to the inlet pressure downstream of orifice 35.

Having thus described the invention, in operation it will now be apparent to those skilled in the art that as the oil circulates through an aircraft engine oil system as shown in Figure 6, for example, the flow of oil will normally be from the sump 106 through the pump 134 and through the engine 94, thence along conduit 92 into the by-pass valve 10, through the oil cooler 102 and back through the valve 10 and the conduit 132 to the sump 106, and the valve 10 will remain in the position shown. The system herein disclosed (Fig. 6) will operate in said manner because normally the oil flow through the orifices 33 and 35 is equal, so that if $P_1$ is the pressure upstream of orifice 35, $P_2$ is the pressure downstream of orifice 35, $P_3$ is the pressure upstream of orifice 33, $P_4$ is the pressure downstream of orifice 33, then $(P_1-P_2)$ and $(P_3-P_4)$ are equal. Since the chamber 70 is open to the pressure $P_1$ and the chamber 76 is open to the pressure $P_2$ and the chamber 72 is open to the pressure $P_3$ and the chamber 74 is open to the pressure $P_4$, and the surfaces of the legs 67 are equal in area, it readily follows that the forces on the piston 65 will be in equilibrium except for the spring 88 which will therefore keep the bleed-valve 86 open which is thereupon operative to connect the pressure $P_1$ in chamber 70 to the spring chamber 24 through the conduit 105.

Thus, the chamber 70 communicates with the spring chamber 24 through the operation of the bleed-valve 86 and conduit 105. Therefore, the spring chamber 24 is open to pressure $P_1$. The chamber 70 also communicates with the sump 106 which is substantially at atmospheric pressure, by means of conduit 105 and the orifice 110, however, the relative opening of the bleed-valve 86 to that of the orifice 110 is so much greater that the pressure in the spring chamber 24 is substantially equal to $P_1$ when the bleed-valve 86 is open.

The downstream pressure $P_2$ of the orifice 35 is connected to the chamber 36 of the valve 10 by means of passageways 96 and 136. Therefore, the difference between the force of the pressure $P_1$ acting on the face of the skirt portion 56 of the plunger 50 and the pressure $P_2$ acting upon the face of the skirt portion 57 of the plunger 50, plus the force of spring 58, is the total force acting to keep the valve 10 in the position shown.

Figure 5:
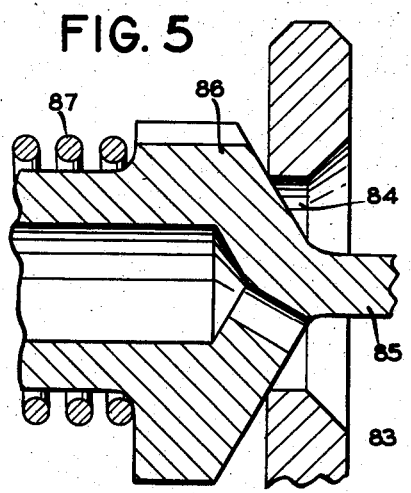
Figure 5 is an enlarged view of the bleed valve herein.

In the event of a leak in the oil cooler caused by a hit from a missile, or otherwise, or of a leak in conduits 128 and 130, the flow through the orifice 33 will be less than the flow through the orifice 35 and therefore the differential pressure $(P_3-P_4)$ will be less than the differential pressure $(P_1-P_2)$. The forces on the sliding plunger 65 will then become unbalanced. When the difference between $(P_1-P_2)$ and $(P_3-P_4)$ is sufficient to overcome the force of the spring 88, the H-shaped plunger moves against the spring 88 thereby causing the closing of the bleed-valve 86 under the biasing force of spring 87 as shown in Figures 3 and 5.

It is to be noted that the strength of the spring 88 determines the minimum amount of leakage which will cause the system to act.

When the servo valve 86 closes, the pressure in the chamber 24 will drop substantially to atmospheric or sump pressure, since the only communication with the chamber 24 will be through the conduit 105 and the orifice 110 to the sump 106 which is open to the atmosphere. This will cause the plunger 50 of the valve 10 to move to the left since chamber 36 is open to the pressure downstream of the orifice 35, $P_2$, via passageways 96 and 136 and $P_2$ acting on the face of the skirt portion 57 develops a force considerably greater than the force of the relatively light spring 58 and sufficient to move the plunger 50 to the left against the spring 58 to a by-pass position. In this position the oil cooler 102 is cut out and the engine lines 92 and 132 are connected together through the center by-pass ports 16, 28, 30 and 20. In this position $P_3$ and $P_4$ will be equal and the plunger 50 will lock in the by-pass position as long as there is oil flow through the by-pass providing a pressure $P_2$ or back pressure acting in chamber 36 through passageways 96 and 136 on the skirt portion 57 sufficient to hold the plunger 50 in the by-pass position. In the latter position of the plunger 50, the chamber 36 also communicates with the sump 106 which is substantially at atmospheric pressure, by means of conduit 116 and the bleed orifice 121; however, the relative opening of the conduits 96 and 136 to that of the bleed orifice 121 is so much greater that the pressure in the chamber 36 is substantially equal to the pressure $P_2$ or the back pressure when the plunger 50 is adjusted to the by-pass position.

In this latter position of the plunger 50, the skirts 52 and 54 will seal against the annular lands of the partitions 40 and 44, respectively, thereby cutting off the flow of oil from inlet 16 through chambers 26 and 28 to the outlet 18, and from the inlet 14 through chambers 30 and 32 to the outlet 20, and diverting the flow from inlet 16 directly to outlet 20 via chambers 28 and 30, thereby eliminating the oil cooler 102 from the system.

Simultaneously with the leftward movement of the plunger 50 (Figs. 2 and 6) the passageway 116 is open to chamber 36 connected to pressure $P_2$ and thereby exposing the bellows to the pressure $P_2$ from the downstream side of the orifice 35 causing the bellows 114 to close the switch 118 energizing the warning light 120 to give a visual warning to the operators of the craft of the dangers of the situation. The bleed orifice 121 is provided to prevent leakage past the plunger 50, in the normal position, from affecting the bellows 114 so as to set off the warning light 120 prematurely. Such leakage will be passed through the orifice 121 and along passageway 116 into conduit 111 and hence to atmosphere in the sump 106.

To obviate the possibility of accidentally by-passing the cooler 102, as for example, when the engine oil system is first being filled, the normally closed solenoid-operated valve 122 is provided. The solenoid valve 122 is operable by a manual switch (not shown here) placed in some location convenient to the operators of the craft, as for example, adjacent to the warning light 120. Opening of the solenoid valve 122 communicates the spring chamber 24 with the pressure $P_1$ in the upstream side of orifice 35 by means of the passageways 90, 124, 126 and 105 thereby causing the plunger 50 to return to the normal position shown in Figure 6 even though the bleed-valve 86 may be closed, since the only opposing pressure would be $P_2$.

If there is no leakage in the system, after momentary operation of the solenoid valve 122, then the H-shaped piston 65 will assume its balanced position at which $(P_1-P_2)=(P_3-P_4)$ and the valve 86 will then be opened and the plunger 50 in the normal position shown (Figs. 2 and 6).

There are thus provided means for protecting the oil supply of an aircraft engine oil system in the event of leakage of the oil cooler by a hit thereon or otherwise, which are simple and easy to install, yet positive and reliable in operation and which are light and compact so as not to penalize the aircraft in space or weight considerations.

Although only one embodiment and one application of the invention has been illustrated and described, various changes in the form and relative arrangements of the parts may be made to suit requirements.

What is claimed is:

1. For use in an engine oil cooler system, a protective device for by-passing the engine oil cooler, comprising, in combination, a casing including a first inlet and outlet and a second inlet and outlet, an orifice in each of said inlets, a plunger within said casing, a plurality of shoulders on said plunger defining chambers within said casings and separating said first inlet and outlet from said second inlet and outlet, a spring in said casing at one end of said plunger and normally biasing said plunger to connect said first inlet to said first outlet and said second inlet to said second outlet, a protuberance on said casing defining a piston chamber, a fixed partition dividing said chamber, an H-shaped piston slidable within said chamber to form four variable chambers therein, first passageway means leading from upstream of said first inlet orifice to the first of said chambers, second passageway means communicating from upstream of said second inlet orifice to the second of said chambers, said second chamber adjacent to said first chamber and defined by said fixed partition, third passageway means communicating downstream of said second inlet to the third of said chambers, said chamber adjacent to said second chamber and defined by said fixed partion, fourth passageway means communicating from downstream of said first inlet orifice to the fourth of said chambers, a bleed-valve operated by said piston, spring means normally biasing said pistons to open said bleed-valve to communicate pressure upstream of said first inlet orifice to said one end of the plunger, means connecting said fourth passageway means to the opposite end of said casing and plunger, bellows means defining an ordinarily open electrical switch, fifth passageway means normally closed by said plunger for communicating the fourth passageway means to said bellows, a warning signal controlled by said switch means, said combination operative upon a change in pressure across said second inlet orifice to cause said H-shaped piston to overcome said spring and close said bleed-valve thereby causing downstream pressure from said first inlet orifice applied at the opposite end of the casing and plunger to overcome said first spring so as to actuate said plunger causing said shoulders to close said outlets from their respective inlets and communicate said first inlet with said second outlet and simultaneously open to the downstream pressure of said first orifice said fifth passageway leading to said bellows to actuate said switch and energize said warning signal.

2. For use in an engine oil cooler system, a protective device for by-passing the engine oil cooler, comprising in combination a casing including a first inlet and outlet and a second inlet and outlet, an orifice in each of said inlets, a plunger within said casing, a plurality of shoulders on said plunger defining chambers within said casing and separating said first inlet and outlet from said second inlet and outlet, a spring in one end of said casing normally biasing said plunger to connect said first inlet to said first outlet and said second inlet to said second outlet, a protuberance on said casing defining a piston chamber, a fixed partition dividing said chamber, an H-shaped piston slidable within said chamber to form four variable chambers therein, passageway means leading from upstream of said first inlet orifice to the first of said chambers, second passageway means communicating from upstream of said second inlet orifice to the second of said chambers, said second chamber adjacent to said first chamber and defined by said fixed partition, third passageway means communicating downstream of said second inlet to the third of said chambers, said chamber adjacent to said second chamber and defined by said fixed partition, fourth passageway means communicating from downstream of said first inlet orifice to the fourth of said chambers, a bleed-valve operated by said piston, spring means normally biasing said piston to open said bleed-valve, means connecting said fourth passageway means to the opposite end of said casing and plunger, said combination operative upon a change in pressure across said second inlet orifice to cause said H-shaped piston to overcome said spring and close said bleed-valve thereby causing downstream pressure from said first inlet orifice to overcome said first spring to actuate said plunger causing said shoulders to close said outlets from their respective inlets and communicate said first inlet with said second outlet.

3. For use in an engine oil cooler system, a protective device for by-passing the engine oil cooler, comprising, in combination, a casing including a first inlet and an outlet and a second inlet and outlet, a plunger within said casing normally communicating said first inlet to said first outlet and said second inlet to said second outlet, an orifice in each of said inlets, a cylindrical portion on said casing, a bulkhead in said cylindrical portion, an H-shaped piston slidable in said cylindrical portion and defining therein a pair of separate chambers on either side of said bulkhead, a bleed-valve operated by said piston, first passageway means communicating upstream pressures of said orifices to one pair of said chambers, second passageway means communicating downstream pressures of said orifices to said other pair of chambers, spring means biasing said piston against said pressures to normally open said bleed-valve, said combination operative upon unbalancing of said pressures in one direction to overcome said spring and close said bleed-valve thereby actuating said plunger to block said inlets from their respective outlets and connect said first inlet to said second outlet.

4. A by-pass valve for use with an oil cooler in an engine oil system having a sump, said valve comprising a casing including a tubular portion, a first inlet and outlet in said casing, a second inlet and outlet in said casing, a plunger slidably mounted within said casing and defining separate chambers communicating said inlets with their respective outlets, an orifice in each of said inlets, a piston slidable within said tubular portion, means including passageways communicating said piston to upstream and downstream pressures of said orifices whereby said piston is responsive to the upstream and downstream pressures of said orifices, a bleed-valve operated by said piston, a passageway connecting said bleed valve to one end of said plunger whereby pressure from the upstream pressure of said first inlet orifice is communicated thereto, a passageway from downstream said first inlet orifice to the opposite end of said plunger, said means operative upon an unbalancing of said orifice pressures to move said piston to close said bleed-valve to thereby actuate said plunger to connect said first inlet to said second outlet.

5. In combination with an engine oil system including a radiator and sump, a conduit from said engine to said radiator, a by-pass valve including an inlet and an outlet for said conduit, a second inlet and outlet on said valve, said second inlet leading from said radiator and said second outlet communicating with said sump, a plunger within said by-pass valve ordinarily communicating said inlets with their respective outlets, an orifice in each inlet, piston valve means within said valve, passageway means communicating said piston valve means with the upstream and downstream pressures of said orifices whereby said piston valve means is responsive to upstream and downstream pressures of said orifices to actuate said plunger to communicate said first inlet to said second outlet upon a drop in said second inlet orifice pressures due to leakage in said radiator, bellows controlled warning signal means, means communicating said bellows to the downstream pressure of said first inlet orifice and effective upon operation of said plunger to actuate said bellows controlled warning signal means, a passageway from upstream of said first inlet orifice to one end of said plunger, and a solenoid operated valve normally closing said passageway and operative upon opening to apply the upstream pressure of said first inlet orifice to one end of said plunger to reset said plunger to normal position after its by-passing actuation as aforesaid.

6. An oil cooler by-pass valve for an engine oil system, said valve comprising a casing including a first inlet and oulet, a second inlet and outlet, a plunger slidably mounted in said casing and constructed and arranged to communicate said first and second inlets with their respective outlets in a first predetermined position and to communicate said first inlet with said second outlet in a second predetermined position, an orifice in each of said inlets, first passageway means communicating the upstream pressure of said first inlet orifice to one end of said plunger, second passageway means communicating the downstream pressure of said first inlet orifice to the opposite end of said plunger, resilient means biasing said plunger in one direction, and bleed valve means including a piston communicating with said first and second inlet orifices and responsive to the pressure differentials across said first and second inlet orifices to control the pressure in said first passageway means, said bleed valve means effective in response to a predetermined pressure differential across said second inlet orifice to control the pressure in said first passageway means to position said plunger in said first predetermined position, and effective upon a change in said predetermined pressure differential across said second inlet orifice to position said plunger in the second predetermined position thereof against the bias of said resilient means.

7. A by-pass valve comprising a casing including a first inlet and outlet, a second inlet and outlet, a resiliently biased plunger slidably mounted in said casing and constructed and arranged to communicate said first and second inlets with their respective outlets in a first predetermined position and to communicate said first inlet with said second outlet in a second predetermined position, an orifice in each of said inlets, first passageway means communicating the upstream pressure of said first inlet orifice to one end of said plunger, second passageway means communicating the downstream pressure of said first inlet orifice to the opposite end of said plunger, and bleed valve means communicating with said first and second inlet orifices and responsive to the pressure differentials across said first and second inlet orifices to control the pressure in said first passageway means, said bleed valve means effective in response to a predetermined pressure differential across said second inlet orifice to control the pressure in said first passageway means to position said plunger in said first predetermined position, and effective upon a change in said predetermined pressure differential across said second inlet orifice to position said plunger in the second predetermined position thereof.

8. In a pressurized lubricating system including an oil cooler having delivery and return conduits, the combination with said delivery and return conduits of means for by-passing said oil cooler, said means comprising a casing including a first inlet and outlet for connection in and to form a part of said delivery conduit, a second inlet and outlet for connection in and to form a part of said return conduit, a plunger slidably mounted in said casing and constructed and arranged to communicate said first and second inlets with their respective outlets in a first predetermined position to pass the oil through said oil cooler and to communicate said first inlet with said second outlet in a second predetermined position to by-pass said oil cooler, an orifice in each of said inlets, first passageway means communicating the upstream pressure of said first inlet orifice to one end of said plunger, second passageway means communicating the downstream pressure of said first inlet orifice to the opposite end of said plunger, resilient means biasing said plunger in one direction, and bleed valve means communicating with said first and second inlet orifices and responsive to the pressure differentials across said first and second inlet orifices to control the pressure in said first passageway means, said bleed valve means effective in response to a predetermined pressure differential across said second inlet orifice to control the pressure in said first passageway means to position said plunger in said first predetermined position, and effective upon a change in said predetermined pressure differential across said second inlet orifice to position said plunger in the second predetermined position thereof against the bias of said resilient means.

9. In a pressurized lubricating system, the combination comprising an oil cooler, a delivery conduit for delivering oil to said oil cooler, a return conduit for returning oil from said oil cooler, and valve means for by-passing said oil cooler, said valve comprising a casing including a first inlet and outlet for connection in and to form a part of said delivery conduit, a second inlet and outlet for connection in and to form a part of said return conduit, a resiliently biased plunger slidably mounted in said casing and constructed and arranged to communicate said first and second inlets with their respective outlets in a first predetermined position whereby the oil passes through said oil cooler and to communicate said first inlet with said second outlet in a second predetermined position whereby said oil by-passes said oil cooler, an orifice in each of said inlets, first passageway means communicating the upstream pressure of said first inlet orifice to one end of said plunger, second passageway means communicating the downstream pressure of said first inlet orifice to the opposite end of said plunger, and bleed valve means communicating with said first and second inlet orifices and responsive to the pressure differentials across said first and second inlet orifices to control the pressure in said first passageway means, said bleed valve means effective in response to a predetermined pressure differential across said second inlet orifice to control the pressure in said first passageway means to position said plunger in said first predetermined position, and effective upon a change in said predetermined pressure differential across said second inlet orifice to position said plunger in the second predetermined position thereof.

References Cited in the file of this patent

UNITED STATES PATENTS

| | | |
|---|---|---|
| 2,396,053 | McEntire | Mar. 5, 1946 |
| 2,404,936 | Wills | July 30, 1946 |
| 2,501,709 | Booth | Mar. 28, 1950 |
| 2,509,504 | Jensen | May 30, 1950 |
| 2,512,190 | Waterman | June 20, 1950 |
| 2,543,652 | Weymouth | Feb. 27, 1951 |

FOREIGN PATENTS

| | | |
|---|---|---|
| 572,889 | Great Britain | Dec. 29, 1945 |
| 669,897 | France | Nov. 21, 1929 |